(12) United States Patent
Choi et al.

(10) Patent No.: US 8,910,489 B2
(45) Date of Patent: Dec. 16, 2014

(54) HEAT PUMP SYSTEM FOR VEHICLE

(75) Inventors: Yong Hyun Choi, Hwaseong-si (KR);
Jae Yeon Kim, Hwaseong-si (KR); Yong Woong Cha, Yongin-si (KR); Wan Je Cho, Suwon-si (KR); Jungha Park, Gunpo-si (KR); Jaesan Kim, Yongin-si (KR); Man Hee Park, Suwon-si (KR); Yong Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 516 days.

(21) Appl. No.: 13/316,371

(22) Filed: Dec. 9, 2011

(65) Prior Publication Data
US 2012/0240604 A1 Sep. 27, 2012

(30) Foreign Application Priority Data
Mar. 23, 2011 (KR) .................. 10-2011-0025613

(51) Int. Cl.
*B60H 1/00* (2006.01)
*F25B 13/00* (2006.01)
*F25B 17/02* (2006.01)
*B60H 1/14* (2006.01)

(52) U.S. Cl.
CPC ............ *B60H 1/00921* (2013.01); *B60H 1/143* (2013.01); *Y02T 10/88* (2013.01)
USPC .................. 62/160; 62/183; 62/185; 236/34.5

(58) Field of Classification Search
CPC ........ F25B 13/00; F25B 29/003; F25B 30/02; F25B 49/027; F25B 2313/027; B60H 1/06; B60H 1/32

USPC ................ 62/159, 160, 181, 183, 185, 259.2; 236/34.5; 165/202
See application file for complete search history.

(56) References Cited

U.S. PATENT DOCUMENTS

| | | | |
|---|---|---|---|
| 3,759,056 A * | 9/1973 | Graber | 62/183 |
| 5,983,652 A * | 11/1999 | Iritani et al. | 62/156 |
| 6,047,770 A * | 4/2000 | Suzuki et al. | 165/202 |
| 6,422,308 B1 | 7/2002 | Okawara et al. | |
| 6,920,922 B2 * | 7/2005 | Takeuchi | 165/202 |
| 2004/0055305 A1 | 3/2004 | Kuroda et al. | |
| 2004/0079096 A1 | 4/2004 | Itoh et al. | |
| 2008/0196877 A1 * | 8/2008 | Zeigler et al. | 165/202 |
| 2008/0276636 A1 | 11/2008 | Thybo et al. | |
| 2009/0241569 A1 | 10/2009 | Okada et al. | |
| 2011/0016896 A1 | 1/2011 | Oomura et al. | |

FOREIGN PATENT DOCUMENTS

| | | | |
|---|---|---|---|
| JP | 08-258548 A | 10/1996 | |
| JP | 3196341 B2 | 6/2001 | |
| JP | 2002353867 A | 12/2002 | |
| JP | 2005-009789 | 1/2005 | |
| JP | 2008-145022 | 6/2008 | |
| KR | 1020010029358 A | 4/2001 | |

(Continued)

*Primary Examiner* — Marc Norman
(74) *Attorney, Agent, or Firm* — Morgan, Lewis & Bockius LLP (57) ABSTRACT

A heat pump system for a vehicle includes a water cooled condenser that uses a coolant as a heat exchange media and uses waste heat generated from a motor and an electronic device to improve heating performance, efficiency, and dehumidifying performance. A control method is also described.

14 Claims, 6 Drawing Sheets

(56) References Cited

FOREIGN PATENT DOCUMENTS

| | | |
|---|---|---|
| KR | 10-0610941 B1 | 8/2006 |
| KR | 1020060118583 A | 11/2006 |
| KR | 10-2007-0039282 A | 4/2007 |
| KR | 10-2007-0075119 A | 7/2007 |
| KR | 10-2009-0021602 A | 3/2009 |
| KR | 10-2010-0026601 A | 3/2010 |

* cited by examiner

HEAT PUMP SYSTEM FOR VEHICLE

CROSS-REFERENCE TO RELATED APPLICATION

This application claims priority to and the benefit of Korean Patent Application No. 10-2011-0025613 filed Mar. 23, 2011, the entire contents of which application is incorporated herein for all purposes by this reference.

BACKGROUND OF INVENTION

1. Field of Invention

The present invention relates to a heat pump system for a vehicle and a control method thereof. More particularly, the present invention relates to a heat pump system for a vehicle in which a water cooled condenser is applied to an electric vehicle and waste heat of a motor and an electronic device is used to improve heating performance and dehumidifying performance, and a control method thereof 2. Description of Related Art Generally, an air conditioning system for a vehicle includes an air conditioning module for warming or cooling a cabin of the vehicle.

Such an air conditioning module circulates a heat-exchanging medium through a condenser, a receiver drier, an expansion valve, and an evaporator by operation of a compressor. The heat-exchanging medium then flows back to the compressor. In this process, the air conditioning module warms the cabin of the vehicle through heat exchange at the evaporator or cools the cabin of the vehicle through heat exchange with a coolant at a heater.

Meanwhile, energy efficiency and environmental pollution are of increasing concern, and environmentally-friendly vehicles substituting for vehicles having an internal combustion engine have been researched. Such environmentally-friendly vehicles include electric vehicles using a fuel cell or electricity as a power source, or hybrid vehicles driven by an engine and an electric battery.

An air conditioning system of an electric vehicle among the environmentally-friendly vehicles, different from that of a typical vehicle, does not use a separate heater. An air conditioning system applied to an electric vehicle is typically called a heat pump system.

According to the heat pump system, a high temperature/pressure gaseous refrigerant compressed at a compressor is condensed at a condenser and then is supplied to an evaporator passing through a receiver drier and an expansion valve in a cooling mode in the summer. The gaseous refrigerant is evaporated at the evaporator and lowers the temperature and humidity of the cabin. However, the heat pump system has characteristics that the high temperature/pressure gaseous refrigerant is used as a heater medium in a warming mode in the winter.

That is, the high temperature/pressure gaseous refrigerant is supplied not to an exterior condenser but to an interior condenser through a valve, and is heat-exchanged with air in the warming mode in the electric vehicle. The heat-exchanged air passes through a positive temperature coefficient (PTC) heater. After that, the air flows into the cabin of the vehicle and raises the cabin temperature of the vehicle.

The high temperature/pressure gaseous refrigerant flowing into the interior condenser is condensed through heat exchange with the air and flows out in a state of liquid refrigerant.

However, a conventional heat pump system as described above is an air-cooled type in which the refrigerant is cooled by outside air, and therefore there is a problem that the structure of the heat exchanger and constituent elements are complicated.

Also, the refrigerant that is cooled by outside air of a very low temperature or a low temperature in winter is cooled by an interior condenser to be exhausted in a very low temperature condition to an outside condenser, and therefore ice is formed on a surface of the outside condenser and heat exchange efficiency of the heat exchange media and heating performance and efficiency are deteriorated, in a case that the cooling mode is transformed to the heating mode, the condensate that stays on the evaporator increases humidity such that moisture is formed on the interior of the glass of the vehicle.

To solve such problems, the compressor stops operating and warming is performed only by the PTC heater in a defrosting mode where a surface of the exterior condenser is defrosted. Therefore, heating performance may be seriously deteriorated, the heating load may be increased due to the increase of power consumption, and the mileage may be decreased when driving while warming.

In addition, since heat for converting the liquid refrigerant into a gaseous refrigerant is insufficient when the liquid refrigerant flows into the interior condenser, compressing efficiency may be deteriorated, heating performance may be seriously deteriorated when the air temperature is low, the system may be unstable, and durability of the compressor may be deteriorated when the liquid refrigerant flows into the compressor.

In addition, noise and vibration may occur due to a frequent open/close operation of a 2-way valve in a dehumidification mode where moisture is removed from the cabin of the vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a heat pump system for a vehicle having advantages of applying a water cooled condenser that uses a coolant as a heat exchange media and using waste heat that is generated from a motor and an electronic device to improve heating performance and efficiency and dehumidifying performance, and a control method thereof.

Various aspects of the present invention provide for a heat pump system that includes a cooling means that is disposed in the vehicle to supply a motor and an electronic device with a coolant through a cooling line and an air conditioning means that is connected to a refrigerant line to control cooling/heating of an interior cabin of the vehicle, wherein the cooling means includes: a radiator that is disposed at the front of the vehicle and through which the coolant is circulated along the cooling line by a water pump and that cools the coolant through heat exchange with outside air; a cooling fan that is disposed at the rear of the radiator; and a water cooled condenser that is connected to the cooling line to circulate the coolant, that selectively uses waste heat that is generated from the motor and the electronic device according to each driving mode to change the coolant temperature, and that is connected to a refrigerant line of the air conditioning means to make the inflow refrigerant exchange heat with the coolant.

The radiator includes a plurality of opening/closing louvers that selectively receive outside air from the front.

The air conditioning means include a heating, ventilation, and air conditioning (HVAC) module that is provided with an opening/closing door that controls outside air passing an evaporator to be selectively supplied to an inner condenser or a positive temperature coefficient (PTC) heater according to heating, cooling, and dehumidifying modes, a compressor that is connected through the evaporator and refrigerant line to compress the gaseous refrigerant, an accumulator that is disposed on a refrigerant line between the compressor and the evaporator and supplies the compressor with the gaseous refrigerant, a first valve that selectively supplies the inner condenser with the refrigerant exhausted from the compressor according to a driving mode of the vehicle, a first expansion valve that receives the refrigerant passing the inner condenser and expands it, a second valve that supplies the evaporator or the accumulator with the expanded refrigerant from the first expansion valve, and a second expansion valve that is disposed between the evaporator and the second valve and expands the refrigerant through opening/closing of the second valve.

The first and second valves are 3-way valves.

The cooling means and the air conditioning means are respectively connected to a controller and are operated by a control signal of the controller.

The cooling means are disposed between the radiator and the motor on the cooling line, and include a third valve that selectively bypasses the cooling line to supply the coolant to the radiator or water pump according to heating, cooling, and dehumidifying modes of the vehicle.

The third valve is 3-way valve.

Other aspects of the present invention provide for a heat pump system for a vehicle that includes cooling means disposed in a vehicle to supply a motor and an electronic device with a coolant through a cooling line and an air conditioning means that is connected to a refrigerant line to control cooling/heating an interior cabin of a vehicle, wherein the cooling means includes: a radiator that is disposed at the front of the vehicle and through which the coolant is circulated along a cooling line through a water pump and that cools the coolant through heat exchange with outside air; a cooling fan that is disposed at the rear of the radiator; and a water cooled condenser that is disposed in parallel with an electronic device, is connected to the cooling line to circulate the coolant, that selectively uses waste heat that is generated from a motor and the electronic device according to each driving mode to change the coolant temperature, and that is connected to a refrigerant line of the air conditioning means to make the inflow refrigerant exchange heat with the coolant.

In accordance with various aspects of the present invention, a control method for operating a heating mode, a cooling mode, and a dehumidifying mode in a heat pump system for a vehicle that includes a cooling means that is connected to a controller and includes a radiator, a water pump, an electronic device, and a motor that are connected throng cooling line, an air conditioning means that is provided with a heating, ventilation, and air conditioning (HVAC) module that includes a plurality of valves, an expansion valve, a compressor, accumulator, an evaporator, an inner condenser, a positive temperature coefficient (PTC) heater, and an opening/closing door that are connected through refrigerant line, and a water cooled condenser that is connected to the cooling line and the refrigerant line, wherein the cooling means increases the temperature of the refrigerant and uses waste heat that is generated from the motor and the electronic device to increase the temperature of coolant that is supplied to the water cooled condenser through heat exchange with the refrigerant that is supplied to the water cooled condenser along, and the air conditioning means makes the refrigerant that is heated through heat exchange with the coolant in the water cooled condenser to pass the accumulator and the compressor through the second valve along the refrigerant line, opens/closes the first valve in a condition that the high temperature/pressure gas refrigerant is compressed to supply the compressed refrigerant to the inner condenser of the HVAC module, wherein the refrigerant passing the inner condenser is expanded through the first expansion valve to be supplied to the water cooled condenser, opens the opening/closing door such that the outside air passing the evaporator of the HVAC module passes the inner condenser, and makes the supplied outside air to pass the inner condenser to heat interior cabin of the vehicle together with selective operation of a PTC heater in the heating mode.

The opening/closing louvers that are disposed at a front side of the radiator is closed to prevent the wind inflow to the radiator in the heating mode.

The cooling means cools the coolant that is supplied to the radiator with operation of the cooling fan, causes the coolant to be supplied to the water cooled condenser cooling the motor and the electronic device through operation of the water pump, and cools the temperature of the refrigerant through heat exchange with the low temperature coolant that is supplied to the water cooled condenser, and the air conditioning means opens the second valve such that the low temperature refrigerant that is cooled while passing the water cooled condenser is supplied to the second expansion valve that is connected to the evaporator of the HVAC module and supplies the expanded refrigerant to the evaporator, exhausts the evaporated refrigerant through heat exchange with outside air in the evaporator in a compressed condition while passing the accumulator and the compressor, operates the first valve to open the refrigerant line that is connected to the water cooled condenser to supply the water cooled condenser therewith, closes the opening/closing door such that the cooled outside air passing the evaporator by the refrigerant is not supplied to the inner condenser, and heats the interior cabin of the vehicle by supplying the cooled outside air to the interior cabin of the vehicle in the heating mode.

The opening/closing louvers that are disposed at the front of the radiator are opened to supply wind to the radiator during a movement of the vehicle.

The cooling means cools the coolant that is supplied to the radiator with operation of the cooling fan, causes the coolant to be supplied to the water cooled condenser cooling the motor and the electronic device through operation of the water pump, and cools the temperature of the refrigerant through heat exchange with a low temperature coolant that is supplied to the water cooled condenser, the air conditioning means opens the second valve such that the low temperature refrigerant that is cooled while passing the water cooled condenser to be supplied to the second expansion valve that is connected to the evaporator of the HVAC module and supplies the expanded refrigerant to the evaporator, exhausts the evaporated refrigerant through heat exchange with the outside in the evaporator in a compressed condition while passing the accumulator and the compressor, operates the first valve to open the refrigerant line that is connected to the inner condenser to supply the inner condenser therewith, wherein the refrigerant that passes the inner condenser is expanded at the first expansion valve and is supplied to the water cooled condenser, and opens the opening/closing door such that the cooled outside air passing the evaporator of the HVAC module passes the inner condenser, wherein the inflowing outside air passes the inner condenser and a PTC heater to dehumidify the interior cabin of a vehicle in the dehumidifying mode.

The controller controls the opening rate of the first and second expansion valves to control the expansion amount of the refrigerant in the dehumidifying mode.

A wind amount of the cooling fan and a flowing amount of the water pump are controlled according to the temperature of the waste heat that is generated from the motor and the electronic device and the temperature of the coolant and the refrigerant in the heating mode, the cooling mode, and the dehumidifying mode.

A heat pump system for a vehicle and a control method thereof according to various aspects of the present invention use a water cooled condenser that uses coolant as a heat exchange media, exchanges heat with refrigerant by using waste heat that is generated from a motor, and an electronic device to improve heating performance and dehumidifying performance, prevent outside frost lamination, and simultaneously reduce heating load and increase travel distance.

Also, in a very cold weather idle condition and driving condition of the heating mode, the overall system together with the PTC heater are simultaneously operated to save the power consumption amount and to reduce heating load such that the travel distance is increased.

Further, in the cooling mode of the vehicle, the coolant is cooled by the low temperature refrigerant to improve the cooling performance, and in the dehumidifying mode, the first and second valves are applied as 3-way valves to reduce noise and vibration that is caused by the opening/closing operation thereof.

Also, the water cooled condenser is used and a coolant is used as a heat exchange media with the refrigerant therein and therefore the structure of the constituent elements is simplified and one radiator can cool the motor and the electronic device such that the overall system is reduced and the efficiency of the radiator is improved.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
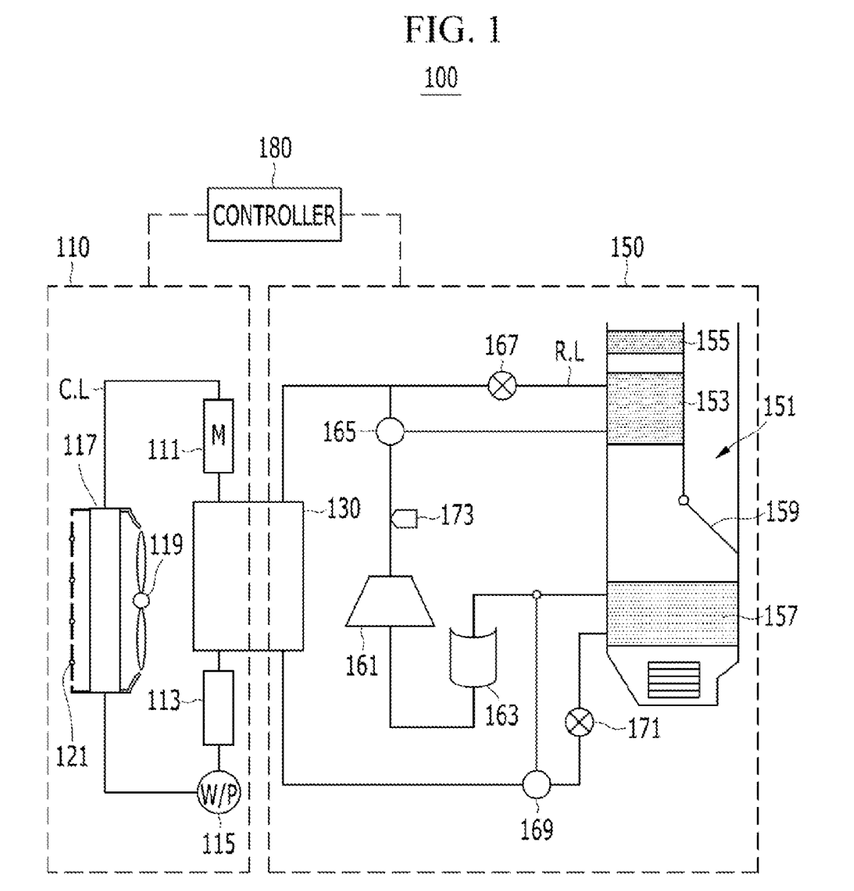
FIG. 1 is a schematic diagram of an exemplary heat pump system for a vehicle according to the present invention.

FIG. 1 is a schematic diagram of a heat pump system for a vehicle according to various embodiments of the present invention.

Referring to the drawings, a heat pump system 100 for a vehicle and a control method thereof according to various embodiments of the present invention uses a water cooled condenser 130 that uses coolant as a heat exchange media, exchanges heat with a refrigerant by using waste heat that is generated from a motor 111 and an electronic device 113 to improve heating performance and dehumidifying performance, prevents outside frost lamination, and simultaneously reduces heating load and increases travel distance.

For this purpose, the heat pump system 100 for the vehicle according to various embodiments of the present invention, as shown in FIG. 1, includes a cooling means 110 that is disposed in a vehicle to supply and circulate coolant to the motor 111 and an electronic device 113 through a cooling line (hereinafter "C.L") of the vehicle, and an air conditioning means 150 that is connected to a refrigerant line (hereinafter "R.L") to control interior cabin heating and cooling of the vehicle.

In various embodiments, the cooling means 110 includes a radiator 117 that is disposed at the front of the vehicle to circulate coolant along the cooling line (C.L) through a water pump 115 and cools the coolant through heat exchange with outside air, and a cooling fan 119 that is disposed at the rear of the radiator 117.

Here, the radiator 117 includes a plurality of opening/closing louvers 121 that selectively supply wind or outside air of the front of the vehicle therethrough.

The opening/closing louvers 121 open or close the front of the radiator 117 according to the heating mode, cooling mode, and dehumidifying mode of the vehicle that is selected by a driver to control the air supply amount such that the cooling performance of the radiator 117 is adjusted.

The heat pump system 100 according to various embodiments further includes the water cooled condenser 130 that is disposed between the motor 111 and the electronic device 113 to be connected to the cooling line (C.L), circulates coolant therethrough, selectively uses waste heat that is generated from the motor 111 and the electronic device 113 to vary the temperature of the coolant, and is connected to a refrigerant line (R.L) of the air conditioning means 150 to make the inflow refrigerant exchange heat with the coolant according to the heating, cooling, and dehumidifying modes.

The water cooled condenser 130 has a temperature sensor therein, and the temperature sensor detects coolant and refrigerant temperatures.

In various embodiments, the air conditioning means 150 includes a heating, ventilation, and air conditioning (HVAC) module 151, a compressor 161, an accumulator 163, first and second valves 165 and 169, and first and second expansion valves 167 and 171, and these will be described as follows.

Firstly, the HVAC module 151 includes an opening/closing door 159 that selectively controls the outside air passing an evaporator 157 to be supplied to an inner condenser 153 and a PTC heater 155 according to the heating, cooling, and dehumidifying modes.

That is, the opening/closing door 159 is opened such that the outside air passing the evaporator 157 is supplied to the inner condenser 153 and the PTC heater 155 in the heating mode of a vehicle, and the opening/closing door 159 closes a passage to the inner condenser 153 and the PTC heater 155 such that the cooled air passing the evaporator 157 is direct supplied to the interior cabin of a vehicle in the cooling mode of a vehicle.

In various embodiments, the compressor 161 is connected to the evaporator 157 through the refrigerant line (R.L) to compress gaseous refrigerant.

The accumulator 163 is disposed on the refrigerant line (R.L) between the compressor 161 and the evaporator 157, and stores fluid refrigerant therein to supply the compressor 161 with only gas refrigerant and evaporates the fluid refrigerant to supply the compressor 161 with the gaseous refrigerant to improve efficiency and durability of the compressor 161.

In various embodiments, the first valve 165 selectively supplies the inner condenser 153 with the refrigerant that is exhausted from the compressor 161 according to a mode of a vehicle, and the first expansion valve 167 receives the refrigerant passing the inner condenser 153 to expand it.

Here, a pressure sensor 173 is disposed on the refrigerant line (R.L) between the compressor 161 and the first valve 165 to detect the pressure of the refrigerant that is exhausted in a compressed condition.

The second valve 169 selectively supplies the refrigerant that is expanded by the first expansion valve 167 or the refrigerant that passes the water cooled condenser 130 by the first valve 165 to the evaporator 157 or the accumulator 163.

Further, the second expansion valve 171 is disposed between the evaporator 157 and the second valve 169 and expands the refrigerant that is supplied by the opening of the second valve 169 to supply it to the evaporator 157.

Here, the first valve 165 that supplies the inner condenser 153 or the water cooled condenser 130 with the refrigerant and the second valve 169 that supplies the accumulator 163 or the second expansion valve 171 with the refrigerant are 3-way valves that selectively open the refrigerant line (R.L).

The cooling means 110 and the air conditioning means 150 as described above are respectively connected to a controller 180 to be operated by a control signal of the controller 180.

That is, the controller 180 operates the heating mode, cooling mode, and dehumidifying mode according to the demand of a driver, and controls the cooling fan 119, the water pump 115, and the opening/closing louvers 121 of the cooling means 110 according to the signal that is outputted from the temperature sensor of the water cooled condenser 130.

Also, the controller 180 controls opening/closing of the opening/closing door 159 of the HVAC module 151, simultaneously controls the opening/closing of the valves 165 and 169, and controls the first and second expansion valves 167 and 171 to control the expansion amount of the refrigerant of the air conditioning means 150 according to the mode of the vehicle.

Hereinafter, an operation and control method of a heat pump system for a vehicle according to various embodiments of the present invention that is describe above will be further detailed with reference to FIG. 2 to FIG. 4.

Figure 2:
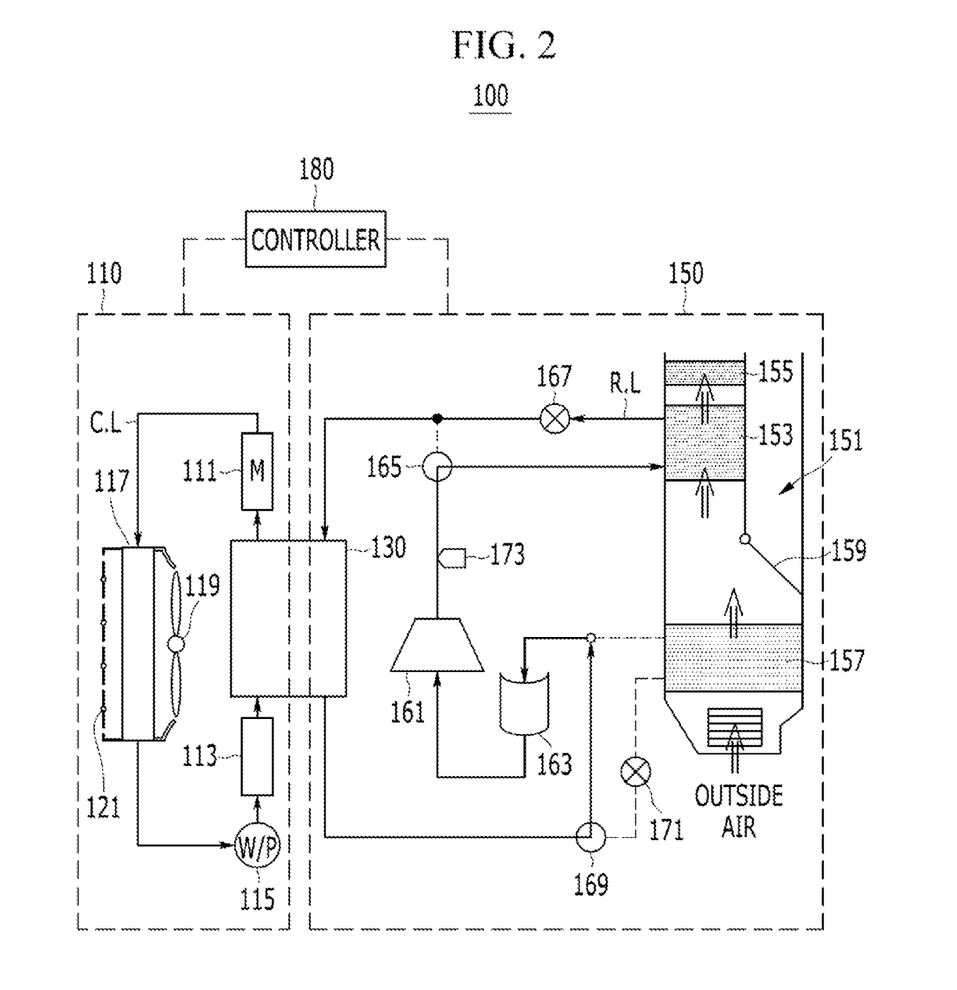
FIG. 2 is an operational chart of an exemplary heat pump system for a vehicle according to the present invention in a warming mode.
Figure 3:
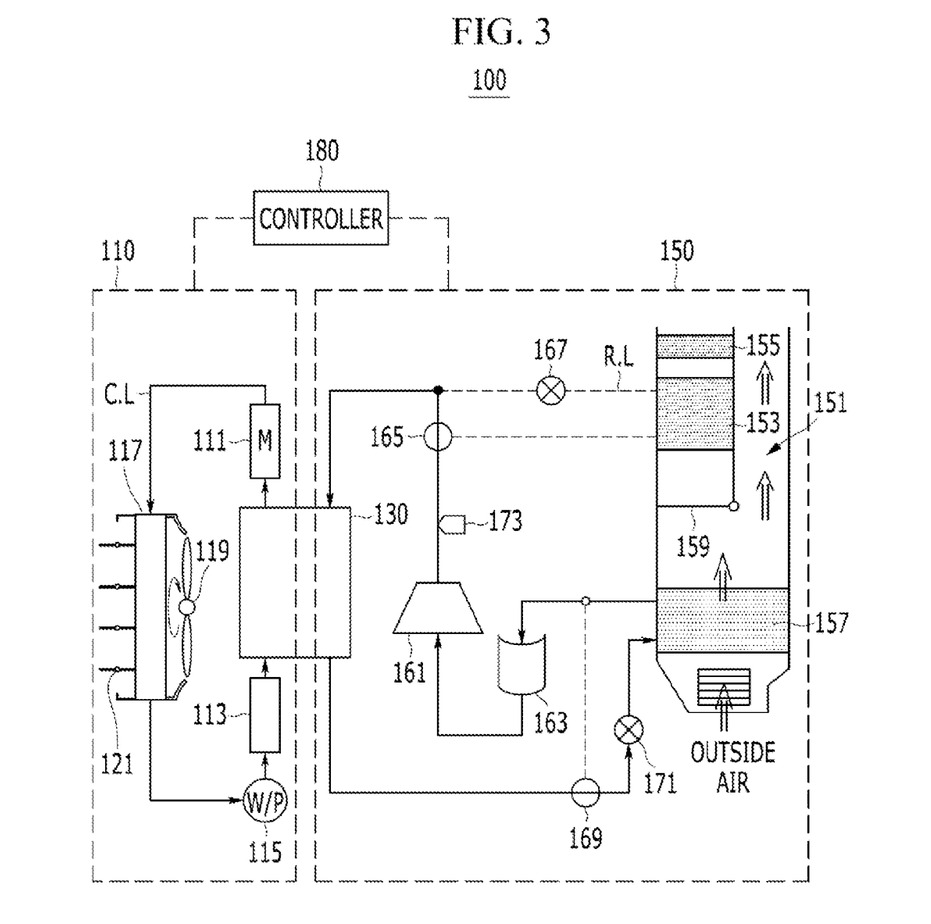
FIG. 3 is an operational chart of an exemplary heat pump system for a vehicle according to the present invention in a cooling mode.
Figure 4:
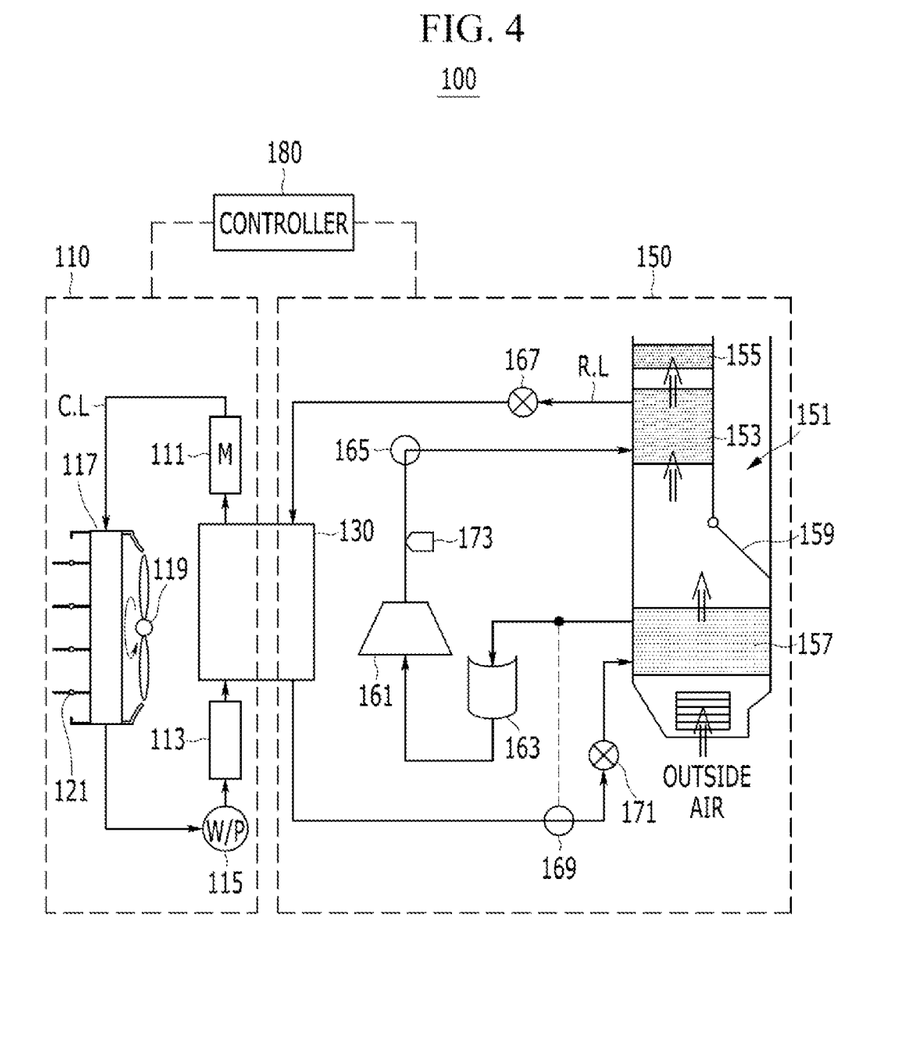
FIG. 4 is an operational chart of an exemplary heat pump system for a vehicle according to the present invention in a dehumidification mode.

FIG. 2 to FIG. 4 are operation charts for the heating mode, cooling mode, and dehumidifying mode of a heat pump system for a vehicle according to various embodiments of the present invention.

Firstly, referring to FIG. 2, the operation and control method for the heating mode of the heat pump system 100 will be described.

Referring to FIG. 2, the cooling means 110 uses waste heat that is generated from the motor 111 and the electronic device 113 to heat the coolant that is supplied to the water cooled condenser 130 along the cooling line (C.L) in the heating mode.

In this case, the opening/closing louvers 131 that are disposed at the front of the radiator 117 are closed by the control signal of the controller 180 to prevent the inflow of the wind to the radiator 117, and simultaneously operation of the cooling fan 119 is stopped or reduced to prevent cooling of the coolant by the radiator 117.

In this condition, the water cooled condenser 130 heats the coolant through heat exchange with the refrigerant that is supplied through the refrigerant line (R.L).

Here, the controller 180 detects the temperature of the refrigerant through the temperature sensor that is disposed in the water cooled condenser 130 and controls the cooling fan 119 or the water pump 115 according to the temperature of the waste heat of the motor 111 and the electronic device 113, the coolant temperature, and the refrigerant pressure.

Further, the air conditioning means 150 opens the second valve 169 to supply the refrigerant that is heated through the heat exchange with the coolant in the water cooled condenser 130 to the accumulator 163 and the compressor 161 through the refrigerant line (R.L).

Accordingly, the refrigerant passes the compressor 161 to become the compressed gas refrigerant of a high temperature/pressure, and the refrigerant line (R.L) that is connected to the inner condenser 153 is opened by the first valve 165 to be supplied to the inner condenser 153.

Here, the pressure sensor 173 that is disposed on the refrigerant line (R.L) between the compressor 161 and the first valve 165 measures the refrigerant pressure that is exhausted from the compressor 161 to output the measured value to the controller 180.

The controller 180 detects the refrigerant pressure according to the measured value from the pressure sensor 173 and controls the opening rate of the first valve 165 according to the vehicle condition that is demanded.

The refrigerant that passes the inner condenser 153 is expanded by the first expansion valve 167 to be supplied to the water cooled condenser 130 along the refrigerant line (R.L), and circulates through the refrigerant line (R.L) by repeating the operation as stated above.

That is, if the gas refrigerant of a high temperature/pressure is supplied to the inner condenser 153 in the heating mode, the controller 180 opens the opening/closing door 159 such that the outside air passing the evaporator 157 of the HVAC module 151 passes the inner condenser 153.

Accordingly, when the inflowing outside air passes the evaporator 157 to which the refrigerant is not supplied, it is not cooled and maintains room temperature, the outside air passes the inner condenser 153 to be heated, and the outside air can be further heated by the PTC heater 155 to be supplied to the interior cabin of the vehicle in the heating mode.

Referring to FIG. 3, operation and control method for the cooling mode of the heat pump system 100 will be described.

First, as shown in FIG. 3, the cooling means 110 operates the cooling fan 119 by the controller 180 to cool the coolant that is supplied to the radiator 117 in the cooling mode.

In this process, the opening/closing louvers 121 are opened by the control signal of the controller 180 to supply the radiator 117 with wind and outside air such that the cooling efficiency of the radiator 117 is increased.

In this condition, the cooled coolant cools the motor 111 and the electronic device 113 along the cooling line (C.L) by the operation of the water pump 115 to be supplied to the water cooled condenser 130 and decreases the temperature of the refrigerant through heat exchange with the low temperature coolant that is supplied to the water cooled condenser 130.

Here, the controller 180 detects the refrigerant temperature by the temperature sensor that is disposed in the water cooled condenser 130 and controls the cooling fan 119 and the water pump 115 according to the temperature of the waste heat that is generated from the motor 111 and the electronic device 113, the coolant temperature, and the refrigerant pressure.

Further, the air conditioning means 150 opens the second valve 169 through the refrigerant line (R.L) to supply the second expansion valve 171 that is connected to the evaporator 157 of the HVAC module 151 with the low temperature refrigerant that is cooled through heat exchange with the low temperature coolant passing the water cooled condenser 130.

Then, the low temperature refrigerant that is supplied to the second expansion valve 171 is expanded to be supplied to the evaporator 157 through the refrigerant line (R.L).

Afterward, the refrigerant is evaporated in the evaporator 157 through heat exchange with outside air and passes the accumulator 163 and the compressor 161 through the refrigerant line (R.L) to be compressed.

In this condition, the refrigerant is supplied to the water cooled condenser 130 by opening the refrigerant line (R.L) that is connected to the water cooled condenser 130 through the first valve 165 and circulates through the refrigerant line (R.L) while repeating the operation as stated above.

Here, the outside air that is supplied to the HVAC module 151 passes the evaporator 157 to be cooled by the low temperature refrigerant that is supplied to the evaporator 157.

In this case, the opening/closing door 159 closes the passage passing the inner condenser 153 such that the cooled outside air does not pass the inner condenser 153 and the PTC heater 155 to supply the interior cabin of the vehicle with the cooled outside air for cooling.

Further, referring to FIG. 4, an operation and control method for the dehumidifying mode of the heat pump system 100 will be described.

First, as shown in FIG. 4, the cooling fan 119 of the cooling means 110 is operated by the controller 180 to cool the coolant that is supplied to the radiator 117 in the dehumidifying mode.

At this moment, the opening/closing louvers 121 are opened by the control signal of the controller 180 such that the wind and outside air is supplied to the radiator 117 to improve the cooling efficiency of the radiator 117.

In this condition, the cooled coolant cools the motor 111 and the electronic device 113 along the cooling line (C.L) by the operation of the water pump 115 to be supplied to the water cooled condenser 130 and decreases the temperature of the refrigerant through heat exchange with the low temperature coolant that is supplied to the water cooled condenser 130.

Here, the controller 180 detects the refrigerant temperature by the temperature sensor that is disposed in the water cooled condenser 130 and controls the cooling fan 119 and the water pump 115 according to the temperature of the waste heat that is generated from the motor 111 and the electronic device 113, the coolant temperature, and the refrigerant pressure.

Further, the air conditioning means 150 opens the second valve 169 through the refrigerant line (R.L) to supply the second expansion valve 171 that is connected to the evaporator 157 of the HVAC module 151 with the low temperature refrigerant that is cooled through heat exchange with the low temperature coolant passing the water cooled condenser 130.

Then, the low temperature refrigerant that is supplied to the second expansion valve 171 is expanded to be supplied to the evaporator 157 through the refrigerant line (R.L).

Afterward, the refrigerant is evaporated in the evaporator 157 through heat exchange with outside air and passes the accumulator 163 and the compressor 161 through the refrigerant line (R.L) to be compressed.

The refrigerant line (R.L) that is connected to the inner condenser 153 is opened by the first valve 165 such that the compressed gas refrigerant is supplied to the inner condenser 153.

Here, the pressure sensor 173 that is disposed on the refrigerant line (R.L) between the compressor 161 and the first valve 165 measures the refrigerant pressure that is exhausted from the compressor 161 to output the measured value to the controller 180.

The controller 180 detects the refrigerant pressure according to the measured value from the pressure sensor 173 and controls the opening rate of the first valve 165 according to the vehicle condition that is demanded.

Further, the refrigerant that passes the inner condenser 153 is expanded by the first expansion valve 167 to be supplied to the water cooled condenser 130 along the refrigerant line (R.L) and circulates through the refrigerant line (R.L) while repeating the operation as stated above.

In this case, the controller 180 controls the expansion amount of the refrigerant by controlling the openings of the first and second expansion valves 165 and 169.

Here, the air flowing into the HVAC module 151 is cooled at the evaporator 157 by the refrigerant of a low temperature flowing into the evaporator 157.

In this case, the opening/closing door 159 opens a part that is connected to the inner condenser 153 such that the cooled outside air passes the inner condenser 153 and the inflow outside air passes the evaporator 157 to be dehumidified, and is heated through the inner condenser 153 to be supplied to the interior cabin of the vehicle in the dehumidifying mode.

Meanwhile, in the heat pump system control method for the vehicle according to various embodiments of the present invention, the PTC heater 155 is operated with the outside air in the heating mode, but it is not limited thereto and the PTC heater 155 may be selectively operated according to a heating temperature that is set by a selection of a driver.

Accordingly, a heat pump system 100 for a vehicle and a control method thereof according to various embodiments of the present invention uses a water cooled condenser 130 that uses coolant as a heat exchange media, exchanges heat with refrigerant by using waste heat that is generated from a motor 111 and an electronic device 113 to improve heating performance and dehumidifying performance, prevents outside frost lamination, and simultaneously reduces heating load and increases travel distance.

Also, in a very cold weather idle condition and driving condition of the heating mode, the overall system together with the PTC heater 155 are simultaneously operated to save the power consumption amount and to reduce heating load such that the travel distance is increased.

Further, in the cooling mode of the vehicle, the coolant is cooled by the low temperature refrigerant to improve the cooling performance, and in the dehumidifying mode, the first and second valves 165 and 169 are applied as 3-way valves to reduce noise and vibration that is caused by the opening/closing operation thereof.

Also, the water cooled condenser 130 is used and a coolant is used as a heat exchange media with the refrigerant therein and therefore the structure of the constituent elements are simplified and one radiator 117 can cool the motor 111 and the electronic device 113 such that the overall system is reduced and the efficiency of the radiator 117 is improved.

Figure 5:
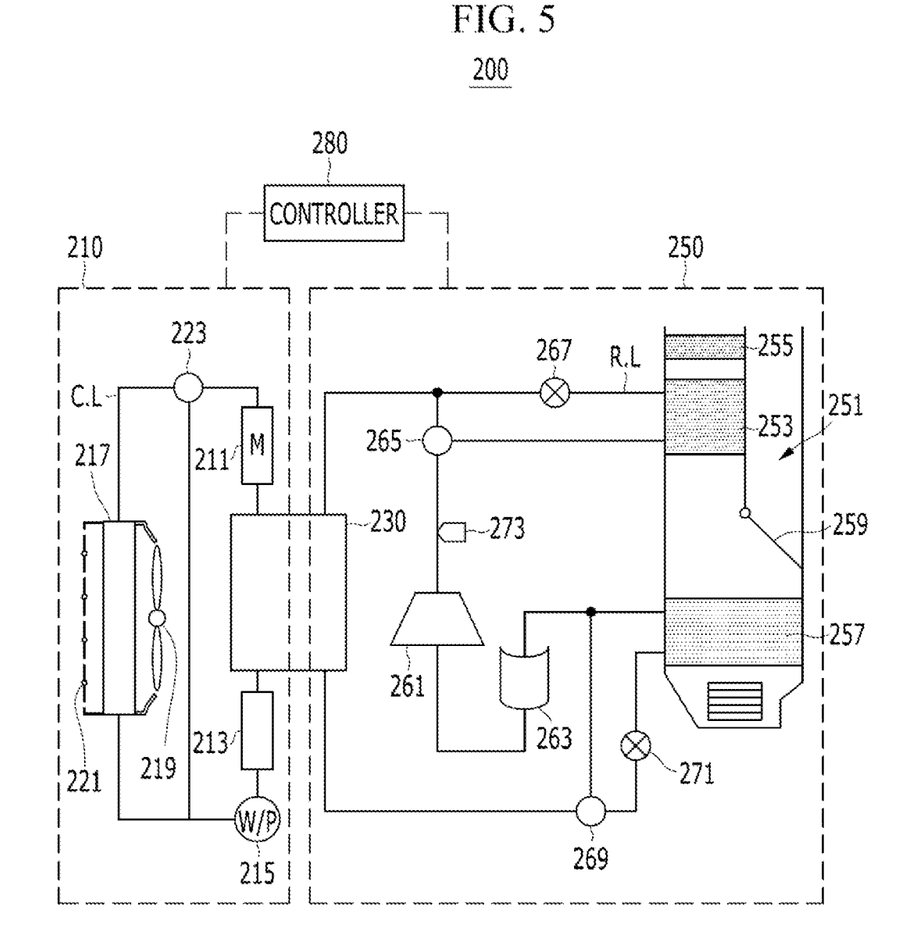
FIG. 5 is a schematic diagram of another exemplary heat pump system for a vehicle according to the present invention.

FIG. 5 is a schematic diagram of a heat pump system for a vehicle according to other embodiments of the present invention.

Referring to the drawings, a heat pump system 200 for a vehicle according to various embodiments of the present invention includes a cooling means 210 that is disposed in a vehicle to supply and circulate coolant to a motor 211 and an electronic device 213 through a cooling line (hereinafter "C.L") of the vehicle, and an air conditioning means 250 that is connected to a refrigerant line (hereinafter "R.L") to control interior cabin heating and cooling of the vehicle.

In various embodiments, the cooling means 210 includes a radiator 217 that is disposed at the front of the vehicle to circulate coolant along the cooling line (C.L) through a water pump 215, and cools the coolant through heat exchange with outside air and a cooling fan 219 that is disposed at the rear of the radiator 217.

Here, the radiator 217 includes a plurality of opening/closing louvers 221 that selectively supply wind or outside air of the front of the vehicle therethrough.

The opening/closing louvers 221 open or close the front of the radiator 217 according to the heating mode, cooling mode, and dehumidifying mode of the vehicle that is selected by a driver to control the air supply amount such that the cooling performance of the radiator 217 is adjusted.

Further, the heat pump system 200 according to various embodiments further includes a water cooled condenser 230 that is disposed between the motor 211 and the electronic device 213 to be connected to the cooling line (C.L), circulates coolant therethrough, selectively uses waste heat that is generated from the motor 211 and the electronic device 213 to vary the temperature of the coolant, and is connected to a refrigerant line (R.L) of the air conditioning means 250 to make the inflow refrigerant exchange heat with the coolant according to the heating, cooling, and dehumidifying modes.

The water cooled condenser 130 has a temperature sensor therein, and the temperature sensor detects coolant and refrigerant temperatures.

Here, the cooling means 210 according to various embodiments of the present invention is disposed on the cooling line (C.L) between the radiator 217 and the motor 211, and includes a third valve 223 that selectively bypasses the cooling line (C.L) to supply the radiator 217 or the water pump 215 with the supplied coolant according to the heating, cooling, and dehumidifying modes of the vehicle.

The third valve 223 that is controlled by the controller 280 is opened or closed such that the coolant is not supplied to the radiator 217 and the water pump 215 supplies the motor 211 and the electronic device 213 with the coolant to increase the temperature of the coolant in the heating mode of the vehicle.

It is desirable that the third valve 223 is a 3-way valve that selectively opens or closes the cooling line (C.L) to supply the radiator 217 or the electronic device 213 with the coolant.

In various embodiments of the present invention, the air conditioning means 250 includes a heating, ventilation, and air conditioning (HVAC) module 251, a compressor 261, an accumulator 263, first and second valves 265 and 269, and first and second expansion valves 267 and 271, and these will be described as follows.

The HVAC module 251 includes an opening/closing door 259 that selectively control the outside air passing an evaporator 257 to be supplied to an inner condenser 253 and a PTC heater 255 according to the heating, cooling, and dehumidifying modes.

The air conditioning means 250 as described above is to the same as that of the above described embodiments of the present invention, and therefore detailed descriptions thereof will be omitted.

Also, the heat pump system control method according to various embodiments of the present invention uses the third valve 223 such that the coolant is not supplied to the radiator 217 and circulates the coolant through the motor 211, the electronic device 215, and the water cooled condenser 230 along the cooling line (C.L) to be able to quickly heat the coolant through the waste heat in the heating mode.

Meanwhile, the heat pump system control method according to various embodiments of the present invention only changes the coolant circulation passage of the cooling means 210 in the heating mode in which the third valve 223 is operated, and the operation and the control method are the same as that described above in the cooling and dehumidifying modes, compared with the first exemplary, and therefore a detailed description thereof will be omitted.

Figure 6:
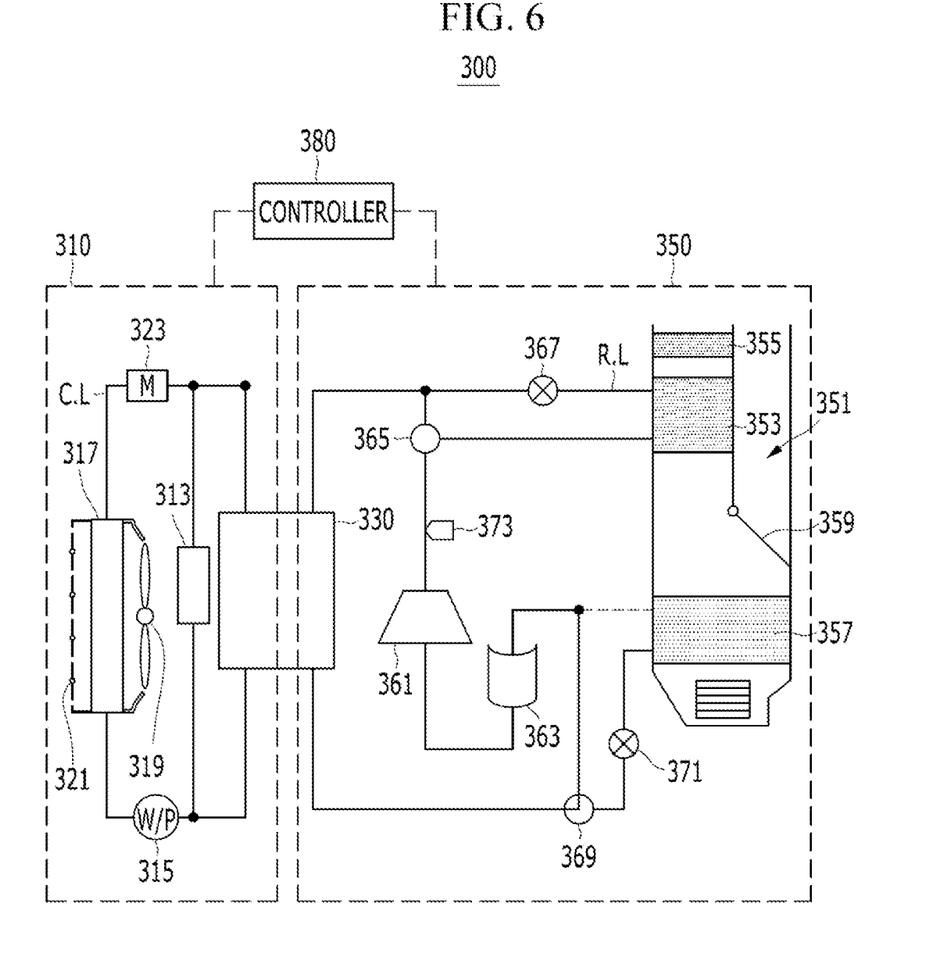
FIG. 6 is a schematic diagram of another heat pump system for a vehicle according to the present invention.

FIG. 6 is a schematic diagram of a heat pump system for a vehicle according to various embodiments of the present invention.

Referring to drawings, a heat pump system 300 for the vehicle according to various embodiments of the present invention includes a cooling means 310 that is disposed in a vehicle to supply and circulate coolant to a motor 311 and an electronic device 313 through a cooling line (hereinafter "C.L") of the vehicle, and an air conditioning means 350 that is connected to a refrigerant line (hereinafter "R.L") to control interior cabin heating and cooling of the vehicle.

In various embodiments, the cooling means 310 includes a radiator 317 that is disposed at the front of a vehicle to circulate coolant along cooling line (C.L) through the water pump 315, and cools the coolant through heat exchange with outside air and a cooling fan 319 that is disposed at the rear of the radiator 317.

Here, the radiator 317 includes a plurality of opening/closing louvers 321 that selectively supply wind or outside air of the front of the vehicle therethrough.

The opening/closing louvers 321 open or close the front of the radiator 317 according to the heating mode, cooling mode, and dehumidifying mode of the vehicle that is selected by a driver to control the air supply amount such that the cooling performance of the radiator 317 is adjusted.

In the heat pump system 300 according to various embodiments of the present invention, the cooling means 310 is disposed in parallel with the electronic device 313 to be connected to the cooling line (C.L) in which the coolant circulates, the waste heat that is generated from the motor 311 and the electronic device 315 is selectively used to heat the coolant according to the heating, cooling, and dehumidifying modes of the vehicle, and a water cooled condenser 330 that is connected to the refrigerant line (R.L) of the air conditioning means 350 makes the refrigerant that is supplied thereto exchange heat with the coolant.

The water cooled condenser 330 has a temperature sensor therein, and the temperature sensor detects coolant and refrigerant temperatures.

In various embodiments of the present invention, the air conditioning means 350 includes a heating, ventilation, and air conditioning (HVAC) module 351, a compressor 361, an accumulator 363, first and second valves 365 and 369, and first and second expansion valves 367 and 371.

Further, the HVAC module 351 includes an opening/closing door 359 that selectively controls the outside air passing an evaporator 357 to be supplied to an inner condenser 353 and a PTC heater 355 according to the heating, cooling, and dehumidifying modes.

The cooling means 310 and the air conditioning means 350 are operated by the control signal of the controller 380.

The air conditioning means 350 as described above is to the same as that of the above described embodiments of the present invention, and therefore detailed description will be omitted.

Also, a different part of the heat pump system control method according to various embodiments of the present invention is that the electronic device 313 is disposed in parallel with the water cooled condenser 130 to be connected to the cooling line (C.L), but the operation and control method of the constituent elements in the heating mode, the cooling mode, and the dehumidifying mode is to the same as that of the above-described exemplary embodiments, and therefore detailed description thereof will be omitted.

Meanwhile, in the heat pump system 300 in various embodiments of the present invention, the electronic device 313 and the water cooled condenser 330 are disposed in parallel with each other in the cooling means 310, but it is not limited thereto, and the water cooled condenser 330 is disposed in parallel not with the electronic device 313 but with the motor 311.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat pump system for a vehicle that includes a cooling module disposed in the vehicle to supply a motor and an electronic device with a coolant through a cooling line and an air conditioning module connected to a refrigerant line to control cooling and heating of an interior cabin of the vehicle, wherein the cooling module comprises:
    a radiator disposed at the front of the vehicle and through which the coolant is circulated along the cooling line by a water pump and that cools the coolant through heat exchange with outside air;
    a cooling fan disposed at the rear of the radiator; and
    a water cooled condenser connected to the cooling line to circulate the coolant, that selectively uses waste heat generated from the motor and the electronic device according to a driving mode to change the coolant temperature, and connected to a refrigerant line of the air conditioning module to make the inflow refrigerant exchange heat with the coolant,
    wherein the water cooled condenser is disposed between the radiator and the motor on the cooling line, and the cooling modules include a third valve that selectively bypasses the cooling line to supply the coolant to the radiator or directly to the water pump according to heating, cooling, and dehumidifying modes of the vehicle.

2. The heat pump system for a vehicle of claim 1, wherein the radiator includes a plurality of opening and closing louvers that selectively receive outside air from the front.

3. The heat pump system for a vehicle of claim 1, wherein the air conditioning module includes:
    a heating, ventilation, and air conditioning (HVAC) module provided with an opening and closing door that controls outside air passing an evaporator to be selectively supplied to an inner condenser or a positive temperature coefficient (PTC) heater according to heating, cooling, and dehumidifying modes;
    a compressor connected through the evaporator and refrigerant line to compress gaseous refrigerant;
    an accumulator disposed on a refrigerant line between the compressor and the evaporator and supplies the compressor with the gaseous refrigerant;
    a first valve that selectively supplies the inner condenser with the refrigerant exhausted from the compressor according to a driving mode of the vehicle;
    a first expansion valve that receives the refrigerant passing the inner condenser and expands it;
    a second valve that supplies the evaporator or the accumulator with the expanded refrigerant from the first expansion valve; and
    a second expansion valve disposed between the evaporator and the second valve and expands the refrigerant through opening/closing of the second valve.

4. The heat pump system for a vehicle of claim 3, wherein the first and second valves are 3-way valves.

5. The heat pump system for a vehicle of claim I, wherein the cooling module and the air conditioning module are respectively connected to a controller and are operated by a control signal of the controller.

6. The heat pump system for a vehicle of claim 1, wherein the third valve is a 3-way valve.

7. A heat pump system for a vehicle that includes cooling module disposed in a vehicle to supply a motor and an electronic device with a coolant through a cooling line and an air conditioning module connected to a refrigerant line to control cooling and heating of an interior cabin of the vehicle, wherein the cooling module comprises:
    a radiator disposed at the front of the vehicle and through which the coolant is circulated along a cooling line through a water pump and that cools the coolant through heat exchange with outside air;
    a cooling fan disposed at the rear of the radiator; and
    a water cooled condenser disposed in parallel with an electronic device, is connected to the cooling line to circulate the coolant, that selectively uses waste heat generated from a motor and the electronic device according to each driving mode to change the coolant temperature, and connected to a refrigerant line of the air conditioning module to make the inflow refrigerant exchange heat with the coolant,
    wherein the water cooled condenser is disposed between the radiator and the motor on the cooling line, and the cooling modules include a third valve that selectively bypasses the cooling line to supply the coolant to the radiator or directly to the water pump according to heating, cooling, and dehumidifying modes of the vehicle.

8. A control method for operating a heating mode, a cooling mode, and a dehumidifying mode in a heat pump system for a vehicle that includes a cooling module connected to a controller and includes a radiator, a water pump, an electronic device, and a motor that are connected through a cooling line, an air conditioning module provided with a heating, ventilation, and air conditioning (HVAC) module that includes a plurality of valves, an expansion valve, a compressor, an accumulator, an evaporator, an inner condenser, a positive temperature coefficient (PTC) heater, and an opening and closing door that are connected through a refrigerant line, and a water cooled condenser connected to the cooling line and the refrigerant line;

wherein the cooling module increases the temperature of the refrigerant and uses waste heat generated from the motor and the electronic device to increase the temperature of the coolant supplied to the water cooled condenser through heat exchange with the refrigerant supplied to the water cooled condenser along; and  the air conditioning module makes the refrigerant heated through heat exchange with the coolant in the water cooled condenser pass the accumulator and the compressor through the second valve along the refrigerant line, opens/closes the first valve in a condition that the high temperature and pressure gas refrigerant is compressed to supply the compressed refrigerant to the inner condenser of the HVAC module, wherein the refrigerant passing the inner condenser is expanded through the first expansion valve to be supplied to the water cooled condenser, opens the opening and closing door such that the outside air passing the evaporator of the HVAC module passes the inner condenser, and makes the supplied outside air pass the inner condenser to heat the interior cabin of the vehicle together with selective operation of the PTC heater in the heating mode,  wherein the water cooled condenser is disposed between the radiator and the motor on the cooling line, and the cooling modules include a third valve that selectively bypasses the cooling line to supply the coolant to the radiator or directly to the water pump according to heating, cooling, and dehumidifying modes of the vehicle.

9. The control method of claim 8, wherein the opening and closing door louvers that are disposed at the front of the radiator are closed to prevent the wind inflow to the radiator in the heating mode.

10. The control method of claim 8, wherein:

the cooling module cool the coolant supplied to the radiator with operation of the cooling fan, cause the coolant to be supplied to the water cooled condenser so as to cool the motor and the electronic device through operation of the water pump, and cools the refrigerant through heat exchange with the low temperature coolant supplied to the water cooled condenser; and  the air conditioning module open the second valve such that the low temperature refrigerant cooled by passing the water cooled condenser to be supplied to the second expansion valve connected to the evaporator of the HVAC module and supply the expanded refrigerant to the evaporator, and exhaust the evaporated refrigerant through heat exchange with outside air in the evaporator in a compressing condition while passing the accumulator and the compressor, and operate the first valve to open the refrigerant line connected to the water cooled condenser to supply the water cooled condenser therewith, and  closes the opening and closing door such that the cooled outside air passing the evaporator by the refrigerant is not supplied to the inner condenser, and cools the interior cabin of the vehicle by supplying the cooled outside air to the interior cabin of the vehicle in the cooling mode.

11. The control method of claim 10, wherein the opening and closing door louvers that are disposed at the front side of the radiator are opened to supply wind to the radiator while the vehicle moves.

12. The control method of claim 8, wherein:

the cooling module cools the coolant supplied to the radiator with operation of the cooling fan, causes the coolant to be supplied to the water cooled condenser through cooling the motor and the electronic device through operation of the water pump, and cools the temperature of the refrigerant through heat exchange with the low temperature coolant supplied to the water cooled condenser;

the air conditioning module opens the second valve such that the low temperature refrigerant cooled while passing the water cooled condenser to be supplied to the second expansion valve connected to the evaporator of the HVAC module and supplies the expanded refrigerant to the evaporator;

exhausts the evaporated refrigerant through heat exchange with outside air in the evaporator in a compressed condition while passing the accumulator and the compressor, and operates the first valve to open the refrigerant line connected to the inner condenser to supply the inner condenser therewith, wherein the refrigerant that passes the inner condenser is expanded in the first expansion valve supplied to the water cooled condenser; and  opens the opening and closing door such that the cooled outside air passing the evaporator of the HVAC module passes the inner condenser, wherein the inflowing outside air passes the inner condenser and a PTC heater to dehumidify the interior cabin of the vehicle in the dehumidifying mode.

13. The control method of claim 12, wherein the controller controls the opening rate of the first and second expansion valves to the control expansion amount of the refrigerant in the dehumidifying mode.

14. The control method of claim 8, wherein a wind amount of the cooling fan and a flowing amount of the water pump are controlled according to the temperature of the waste heat generated from the motor and the electronic device and the temperature of the coolant and the refrigerant in the heating mode, the cooling mode, and the dehumidifying mode.

\* \* \* \* \*